(12) United States Patent
Goossen

(10) Patent No.: US 6,424,450 B1
(45) Date of Patent: Jul. 23, 2002

(54) OPTICAL MODULATOR HAVING LOW INSERTION LOSS AND WIDE BANDWIDTH

(75) Inventor: Keith W. Goossen, Howell, NJ (US)

(73) Assignee: Aralight, Inc., Jamesburg, NJ (US)

( * ) Notice: Subject to any disclaimer, the term of this patent is extended or adjusted under 35 U.S.C. 154(b) by 0 days.

(21) Appl. No.: 09/726,179

(22) Filed: Nov. 29, 2000

(51) Int. Cl.[7] .............................................. G02B 26/00
(52) U.S. Cl. ........................ 359/290; 359/291; 359/292; 359/298
(58) Field of Search ................................. 359/290, 291, 359/292, 846, 847, 850, 298, 318, 302, 263

(56) References Cited

U.S. PATENT DOCUMENTS

| | | |
|---|---|---|
| 5,500,761 A | 3/1996 | Goossen et al. |
| 5,589,974 A | 12/1996 | Goossen et al. |
| 5,654,819 A | 8/1997 | Goossen et al. |
| 5,710,656 A * | 1/1998 | Goossen ...................... 359/291 |
| 5,751,469 A | 5/1998 | Arney et al. |
| 5,808,781 A | 9/1998 | Arney et al. |
| 5,825,528 A | 10/1998 | Goossen |
| 5,838,484 A | 11/1998 | Goossen |
| 5,870,221 A | 2/1999 | Goossen |
| 5,914,804 A | 6/1999 | Goossen |

* cited by examiner

Primary Examiner—Hung Xuan Dang
Assistant Examiner—Tuyen Tra
(74) Attorney, Agent, or Firm—DeMont & Breyer, LLC

(57) ABSTRACT

A modulator that provides low insertion loss and wide bandwidth. The modulator has a single layer, quarter wave membrane that is suspended over a substrate. The membrane has a refractive index, $n_m$, in a range of about $1.1 n_s^{0.5} \leq n_m \leq 1.4 n_s^{0.5}$. When actuated, the membrane moves toward the substrate, altering the reflectivity of the modulator. In some embodiments, the substrate is germanium, which has a protective layer disposed thereon to protect it from etchant during MEMS fabrication procedures.

15 Claims, 3 Drawing Sheets

OPTICAL MODULATOR HAVING LOW INSERTION LOSS AND WIDE BANDWIDTH

CROSS-REFERENCE TO RELATED APPLICATIONS

This application is related to the following U.S. Pat. Nos. 5,500,761; 5,589,974; 5,654,819; 5,751,469; 5,808,781; 5,825,528; 5,838,484; 5,870,221 and 5,914,804, all of which are incorporated herein by reference.

FIELD OF THE INVENTION

The present invention pertains to optical modulators. More particularly, the present invention relates to micro electromechanical systems (MEMS)-based optical modulators that rely on optical interference as a principle of operation.

BACKGROUND OF THE INVENTION

Some optical modulators are capable of varying the intensity of an optical signal. This intensity variation can be achieved using optical interference principles. Modulators relying on this operating principle typically incorporate an optical cavity that is defined by two spaced surfaces having appropriate indices of refraction. Varying the size of the gap between the two surfaces alters the reflectivity of the optical cavity.

Optical modulators that operate in this fashion have been built using MEMS technology. For example, FIGS. 1–3 depict a MEMS-based optical modulator 100 that is disclosed in U.S. Pat. No. 5,751,469.

Referring now to FIG. 1 (cross-sectional view) and FIG. 2 (plan view), modulator 100 includes a membrane 104 that is suspended above substrate 102 by support layer 106. Membrane 104 and substrate 102 are parallel to one another and separated by gap 108. In modulator 100, membrane 104 completely overlaps optical cavity 110 which is defined laterally by the perimeter of a circular opening in support layer 106 and vertically by membrane 104 on top and substrate 102 on the bottom. Membrane 104 overlaps the optical cavity in the same manner as a drum-head overlaps the body of a drum.

As a consequence of the circular shape of optical cavity 110, the unsupported portion of membrane 104 (i.e., the portion of the optical cavity) is, of course, circular. As described in U.S. Pat. No. 5,751,469, this configuration advantageously significantly reduces stress that would otherwise concentrate in the narrow membrane support arms that are typically used to support the membrane in other prior art designs (see, e.g., U.S. Pat. No. 5,500,761).

Membrane 104 advantageously has a plurality of holes 112. In the embodiment depicted in FIG. 2, holes 112 are radially arranged, although other configurations can suitably be used. Holes 112 damp membrane vibration and are also used during fabrication to deliver etchant, typically HF acid beneath membrane 104 to create optical cavity 110. Holes 112 are located in membrane 104 outside of a centrally located "optical window" 114 that receives optical signal 120 from an optical waveguide, such as an optical fiber (not shown).

In operation, membrane 104 moves toward substrate 102 (see FIG. 3) under the action of an actuating force. And, as it does so, the size of gap 108 decreases, altering optical properties of optical cavity 110. In particular, the reflectivity of the device changes. For a membrane having a thickness equal to one quarter of a wavelength of the incident optical signal, as measured in the membrane (hereinafter "quarter-wave" layer or membrane or "$\lambda/4$"), a relative maxima in reflectivity occurs when gap 108 is equal to odd integer multiples of one-quarter of the operating wavelength ("high reflectivity state"). That is, relative maxima occur at:

$$R_{Max} = m\lambda/4 \qquad [1]$$

where: $\lambda$ is the operating wavelength of the modulator; and
m equals 1, 3, 5 . . .

Similarly, relative minima in reflectivity occur when gap 108 is equal to zero or an even integer multiple of one-quarter of the operating wavelength ("low reflectivity state"):

$$R_{Min} = m\lambda/4 \qquad [2]$$

where: $\lambda$ is the operating wavelength of the modulator; and
m equals 0, 2, 4 . . .

The maximum contrast (see below; contrast=$R_{Max}/R_{Min}$) is obtained when, in one state of the modulator, the size of gap 108 results in a reflectivity maxima and, in the other state, the size of gap 108 results in a reflectivity minima. Consequently, in a "quiescent" or "non-actuated" state, as those terms are used herein, membrane 104 has a first position wherein the size of the gap is such that either an $R_{Max}$ or $R_{Min}$ condition is met. In an "actuated state," as that term is used herein, membrane 104 moves to a second position nearer substrate 102. Again, for maximum contrast, membrane 104 moves through a distance $\lambda/4$ when actuated.

In practice, the difference in size of gap 104 in the non-actuated and actuated states is often less than $\lambda/4$ since the membrane "snaps down" to the substrate if membrane deflections greater than about thirty to thirty-five percent (relative to the size of the gap in the unbiased state) occur. Consequently, rather than specifying, for example, that the membrane moves between a non-actuated position of $3\lambda/4$ to an actuated position of $2\lambda/4$, a more conservative design will specify that the membrane moves between a non-actuated position of about $0.7\lambda$, to an actuated position of $2\lambda/4$. In the former design, snap down will probably occur since the membrane deflects an amount equal to: $(3\lambda/4-2\lambda/4)/(3\lambda/4)$ or 33 percent. In the conservative design, snap down is avoided since the membrane deflects less than about thirty percent: $(0.7\lambda-2\lambda/4)/(0.7\lambda)=28.6$ percent.

In some embodiments, the actuating force for moving the membrane is an electrostatic force that is generated by creating a potential difference across substrate 102 and membrane 104. To that end, membrane 104 and substrate 102 are suitably conductive, or otherwise include a region of metallization or doping to provide such conductivity. In modulator 100 depicted in FIGS. 1–3, the electrostatic actuating system includes contact 116, which is in electrical contact with membrane 104 and controlled voltage source 222, and contact 118, which is in electrical contact with substrate 102 and controlled voltage source 222.

The performance of modulator 100 can be gauged using several parameters. Once such parameter is "contrast," which, as that term is used herein, is the ratio of maximum reflectance to minimum reflectance for the modulator. Another important performance parameter is the theoretical "insertion loss," which, as used herein, is one hundred minus the maximum reflectance of the modulator. A third performance parameter is "bandwidth," which for the purposes of the present Specification, means the range of wavelengths over which an acceptable amount of contrast is obtained. These performance parameters of optical modulator 100 are dependent upon certain physical characteristics of the modulator such as the refractive indices of membrane 104 and substrate 102, the thickness of the membrane 104 and the size of gap 108.

A modulator possessing high contrast, low insertion loss and a wide bandwidth is desirable. But neither modulator 100, nor other prior art MEMS-based optical modulators, possess the full measure of all of these characteristics. It is known, however, that these characteristics can be traded-off, as desired. The trade-off among performance parameters is accomplished by manipulating the aforedescribed physical characteristics. TABLE I provides a summary of the manner in which modulator physical characteristics have been manipulated in the prior art to achieve a desired modulator performance. Abbreviations used in the table include: $n_m$ for the refractive index of the membrane, $n_s$ for the refractive index of the substrate, L1, L2, etc., indicates a first layer of the membrane, second layer of the membrane, etc.

Fabry-Perot. So, this modulator provides wide bandwidth (and high contrast) at the expense of increased insertion loss.

The proviso in U.S. Pat. No. 5,500,761 concerning the refractive index of the membrane is somewhat problematic. In particular, the logical materials choice for the membrane-silicon nitride-exhibits undesirable mechanical properties (i.e., the intrinsic stress is too high) at the desired refractive index (e.g., 1.87 if silicon is used as the substrate).

U.S. Pat. No. 5,825,528 addresses the refractive index limitation of U.S. Pat. No. 5,500,761 with a phase-mismatched modulator. In the phase-mismatched modulator, the phase of the reflectivity of the membrane and the phase of the reflectivity of the substrate deviates by more than 180 degrees. Relaxing the phase requirement advantageously relaxes the requirement that the membrane must have a refractive index that is equal to the square root of the refractive index of the substrate.

TABLE 1

| Source | Membrane Thickness and No. of Layers | Refractive Index of Layers | Reflectivity of Membrane vs. Substrate | Gap at $R_{max}$ and Gap at $R_{min}$ | Relative Insertion Loss | Relative Bandwidth | Relative Contrast |
|---|---|---|---|---|---|---|---|
| U. S. Pat. No. 5,500,761 | Typically 1 or 2. each of which are λ/4 | L1 $n_m = n_s^{0.5}$<br>L2 $n_m = n_s$ | Equal in magnitude & opposite in phase | m(λ/4): for $R_{max}$ m = odd for $R_{min}$ m = even | High | Wide | High |
| U. S. Pat. No. 5,654,819 | At lease 3, L1 = λ/4 L2 = λ/4 L3 = λ/2 | L1 $n_m = n_s$<br>L2 $n_m = n_s^{0.5}$<br>L3 $n_m = n_s$ | Equal in magnitude & opposite in phase | m(λ/4) for $R_{max}$ m = odd for $R_{min}$ m = even | High | Very Wide | High |
| U. S. Pat. No. 5,825,528 | Pref. 1; thickness is a f($n_m$, $n_s$, gap size) | L1 $n_m > n_s^{0.5}$ | Equal in magnitude & phase mismatched | Not off and even multiples of m(λ/4) | High | Wide | High |
| U. S. Pat. No. 5,838,484 | Typically 1 or 2, each of which are λ/4 | L1 $n_m = n_s^{0.5}$<br>L2 $n_m = n_s$ | Equal in magnitude & opposite in phase | Selected to give linear reflectivty vs. voltage | High | Narrow | Low |
| U. S. Pat. No. 5,870,221 | Typically 1 or 2, each less than λ/4 | If 1 layer, then $n_m = n_s$ If 2 layers, then $n_m = n_s$ and $n_m = (0.8–1.2)n_s^{.5}$ | Unequal in magnitude & opposite in phase | m(λ/4) for $R_{max}$ m = odd for $R_{min}$ m = even | Low | Wide | Low |
| U. S. Pat. No. 5,914,804 | Three multi-layer mirrors, each mλ/4 | | Equal in magnitude & opposite in phase | Multiple gaps | Low | Moderate | High |

Consider, for example, a traditional Fabry-Perot cavity modulator having a membrane and substrate implemented as multi-layer dielectric mirrors having high and equal reflectivity. Such a modulator can achieve a very high reflectivity (i.e., low insertion loss), with theoretical device reflectivity exceeding 90 percent. But, the traditional Fabry-Perot cavity modulator typically exhibits a rather narrow operating bandwidth of about 5 nanometers around a center operating wavelength.

U.S. Pat. No. 5,500,761 addresses the narrow bandwidth drawback of the traditional Fabry-Perot cavity by specifying a quarter wave membrane having a refractive index that is approximately equal to the square root of the refractive index of the substrate. Opposite phase mirrors (i.e., 180 degree phase deviation) are used to obtain maximal contrast (i.e., zero reflectivity in the minimum reflectivity state).

But the maximum reflectivity of the modulator disclosed in U.S. Pat. No. 5,500,761 is less than that of a traditional U.S. Pat. No. 5,870,221 discloses that contrast ratio can be traded off to obtain a modulator having both low insertion loss and relatively broad operating bandwidth. According to the '221 patent, in a modulator having unequal reflectivity mirrors, the operating bandwidth is determined by the lower reflectivity mirror. Consequently, a modulator characterized by the broad operating bandwidth of the '761 patent, but the low insertion loss of traditional high finesse Fabry-Perot cavity, is obtained by using a low finesse mirror as the substrate and a higher finesse mirror as the membrane. According to U.S. Pat. No. 5,870,221, the membrane has at least one layer that has a refractive index that is about equal to the refractive index of the substrate. Furthermore, unlike the '761 patent, the membrane is not a quarter-wave layer (i.e., has a thickness other than a quarter of a wavelength of the incident optical signal).

The response (i.e., modulator reflectivity as a function of applied voltage) of the aforementioned MEMS-based optical modulators is nonlinear when considered over their full operating range. While such non-linearity is typically not objectionable for digital applications, a linear operating characteristic is often strongly preferred for analog applications (e.g., cable television, standard telephony and radio applications). U.S. Pat. No. 5,838,484, manipulates physical characteristics to provide a modulator with a linear operating characteristic.

While the prior art discloses some ways to manipulate modulator physical characteristics to achieve specific performance goals, further teachings along these lines will be of benefit to the art.

SUMMARY OF THE INVENTION

In accordance with the present teachings, the physical characteristics of MEMS-based optical modulators are manipulated in new ways to achieve desired performance goals. For example, in one embodiment, the present optical modulators trade contrast ratio (i.e., accept a relatively low contrast ratio) for low insertion loss and wide bandwidth.

The present modulators advantageously comprise a single layer, quarter wave membrane that is suspended over a substrate. In some embodiments, the refractive index, nm, of the membrane is in a range $1.1n_s^{0.5} \leq n_m \leq 1.4n_s^{0.5}$. The membrane is movable toward the substrate when actuated. And as the membrane moves, the reflectivity of the modulator changes.

In comparison with some prior MEMS-based optical modulators, such as those that restrict the refractive index, $n_m$, by the proviso that $n_m=n_s^{0.5}$, the present optical modulators advantageously exhibit lower insertion loss. But in comparison to some other MEMS-based modulators, the present modulators simply provide equivalent performance. To the extent that the present modulators are no better, in terms of performance, than some earlier designs, the inventive physical configuration is simpler to fabricate. But in all cases, the present modulators achieve low insertion loss and wide bandwidth via a different physical configuration (e.g., membrane characteristics, etc.) than prior art MEMS-based optical modulators.

In further embodiments, the present modulators use a germanium substrate. Modulators having germanium substrates can achieve higher reflectivity than modulators having silicon substrates. In accordance with the present teachings, a protective layer is disposed on the germanium substrate. The protective layer protects the germanium layer from HF etchant that is typically used during the MEMS fabrication procedures.

These and other features of the invention will become more apparent from the following Detailed Description when read in conjunction with the accompanying Drawings, in which like elements have like reference numerals.

DETAILED DESCRIPTION

Figure 1:
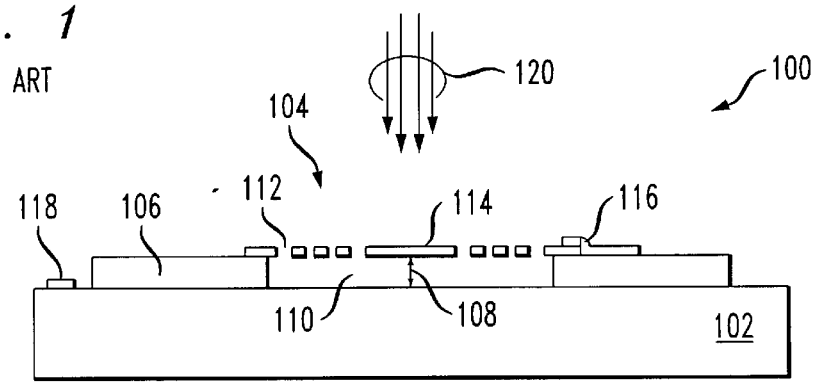
FIG. 1 depicts a cross-sectional view of a prior art modulator in a non-actuated state.
Figure 2:
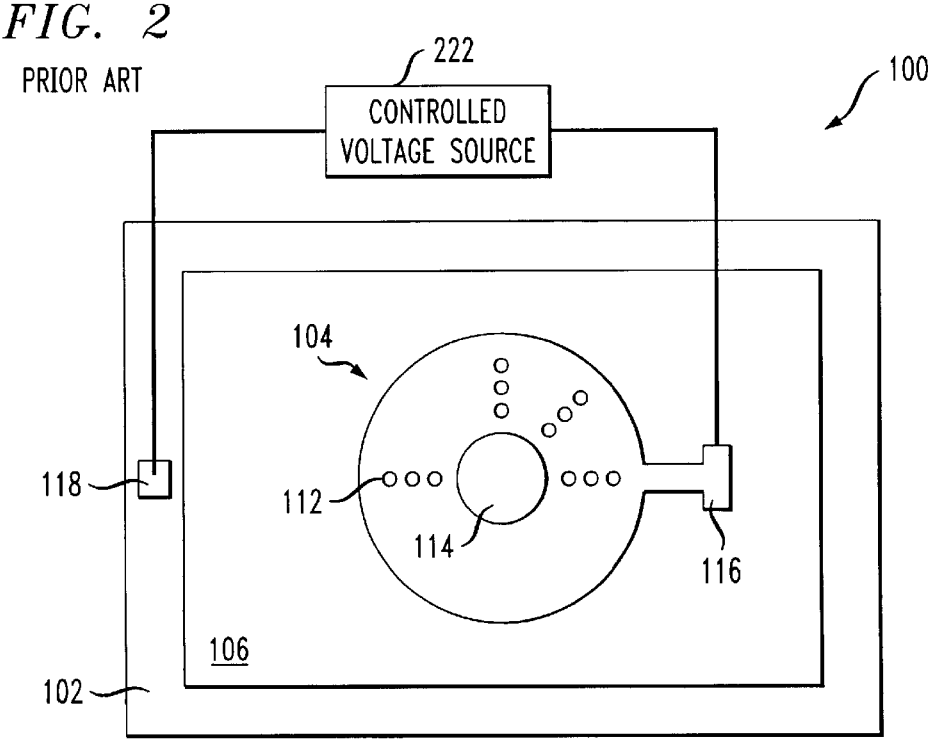
FIG. 2 depicts a top view of the modulator of FIG. 1.
Figure 3:
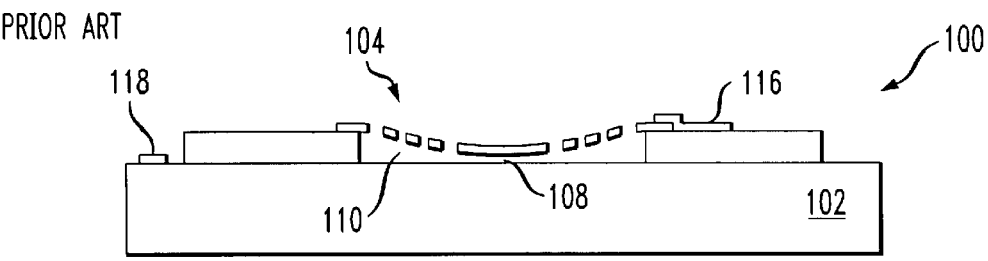
FIG. 3 depicts a side view of the modulator of FIG. 1 when the modulator is in an actuated state.

For the sake of clarity, and to emphasize the applicability of the inventive principles to a variety of basic modulator configurations, only those elements of the present modulators that are germane to the present invention are described in this Detailed Description. It is within the capabilities of those skilled to incorporate the present teachings into a modulator such as the one described in the Background section and depicted in FIGS. 1–3 (see, U.S. Pat. No. 5,751,469). That modulator includes a circular "drum-head" membrane that overlaps the perimeter of an underlying optical cavity.

And it is to be understood that the inventive principles are widely applicable to other MEMS-based optical modulators having a movable membrane spaced from a substrate, etc. For example, those skilled in the art will be able to apply the principles of the present invention to the MEMS-based optical modulators that are disclosed in U.S. Pat. No. 5,500,761, which include a membrane that does not completely overlap the modulator cavity.

To provide context for the present invention, consider U.S. Pat. No. 5,500,761. As indicated in TABLE 1, that modulator comprises at least one quarter wave layer of material having a refractive index that is about equal to the square root of the refractive index of the substrate. When the gap between the membrane and substrate is an even multiple of one quarter of the operating wavelength, the reflectivity is zero, and when the gap is an odd multiple of one quarter of the operating wavelength, the reflectivity is at a maximum.

While the modulator disclosed in U.S. Pat. No. 5,500,761 truly minimizes reflectivity in the low-reflectivity state, it does not maximize reflectivity in the high-reflectivity state. In accordance with the present teachings, the reflectivity in the high-reflectivity state is increased by allowing the refractive index of the membrane to increase so that $n_m > n_s^{0.5}$, while advantageously maintaining membrane thickness as a quarter-wave layer.

The reflectivity in the low-reflectivity state increases as well such that contrast is lowered; but, in many applications, high contrast is not required. For a quarter wave membrane, the reflectivity in the low-reflectivity state still occurs when the gap between the membrane and substrate is an even multiple of quarter wavelengths, and is given by:

$$R_{min}=(n_s-n_m^2)^2/(n_s+n_m^2)^2 \quad [3]$$

rearranging, $$n_m=n_s^{0.5}(1+R_{min}^{0.5})^{0.5}/(1-R_{min}^{0.5})^{0.5} \quad [4]$$

So, for example, if one percent reflectivity in the low-reflectivity state (i.e., $R_{min}$) is considered to be acceptable, then, according to expression [4], $n_m \approx 1.10n_s^{0.5}$. Maximum reflectivity, $R_{max}$, is given by:

$$R_{max}=1-[(1-r_m)\times(1-r_s)]/(1+(r_m r_s)^{0.5})^2 \quad [5]$$

where: $r_m$ is the reflectivity of the membrane; and $r_s$ is the reflectivity of the substrate.

$$r_m = (1-n_m^2)^2/(1+n_m^2)^2 \quad [6]$$

$$r_s(1-n_s)^2/(1+n_s)^2 \quad [7]$$

Continuing with the previous example, an increase in the refractive index of the membrane, $n_m$, by ten percent relative to the design used in U.S. Pat. No. 5,500,761 (i.e., $n_m = n_s^{0.5}$), raises $R_{max}$ from 71.8 percent to 76.1 percent for a silicon substrate. This corresponds to a reduction in signal loss of 15 percent.

Figure 4:
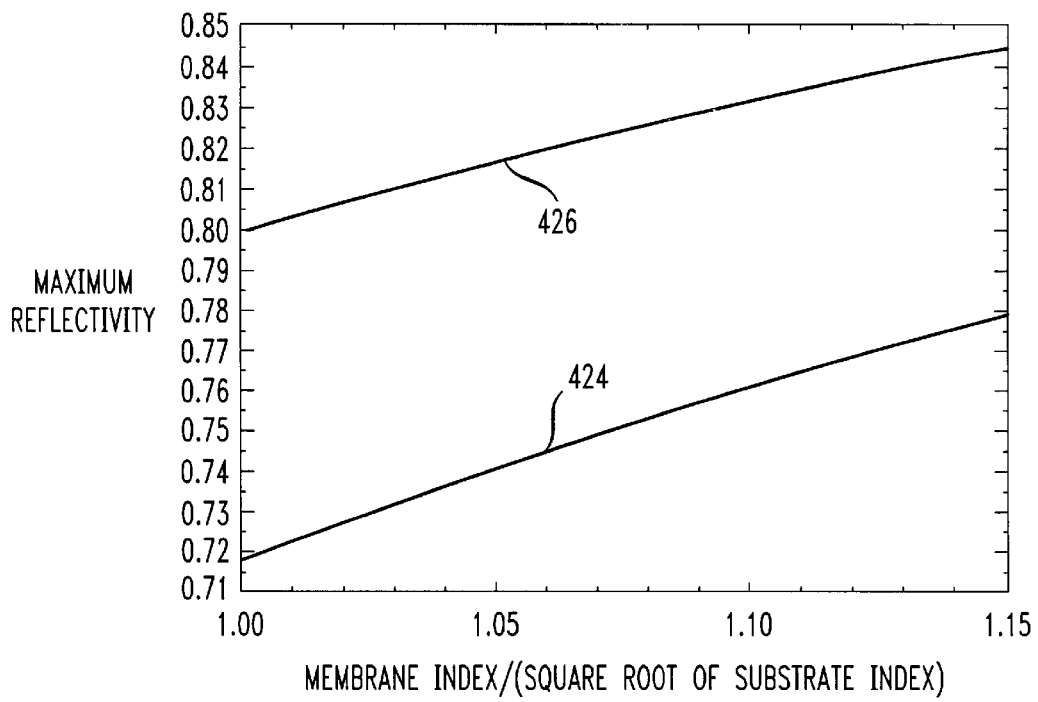
FIG. 4 depicts maximum reflectivity of silicon and germanium substrates as a function of the refractive index of the membrane.

FIG. 4, which depicts maximum reflectivity as a function of the parameter $n_m/n_s^{0.5}$, shows that for a silicon substrate with $n_s = 3.48$ (plot 424), maximum modulator reflectivity (for a quarter wave membrane) when $n_m/n_s^{0.5} = 1$ is about 71.8 percent. When this ratio is allowed to increase so that, for example, $n_m/n_s^{0.5} = 1.15$ maximum reflectivity increases to about 77.8 percent. Plot 426 depicts reflectivity as a function of the parameter $n_m/n_s^{0.5}$ for germanium substrate with $n_s = 4.234$. Plot 426 shows that higher reflectivity is obtainable with a germanium substrate than with a silicon substrate. Using germanium as a substrate for the present modulators is described in further detail later in this Detailed Description.

Figure 5:
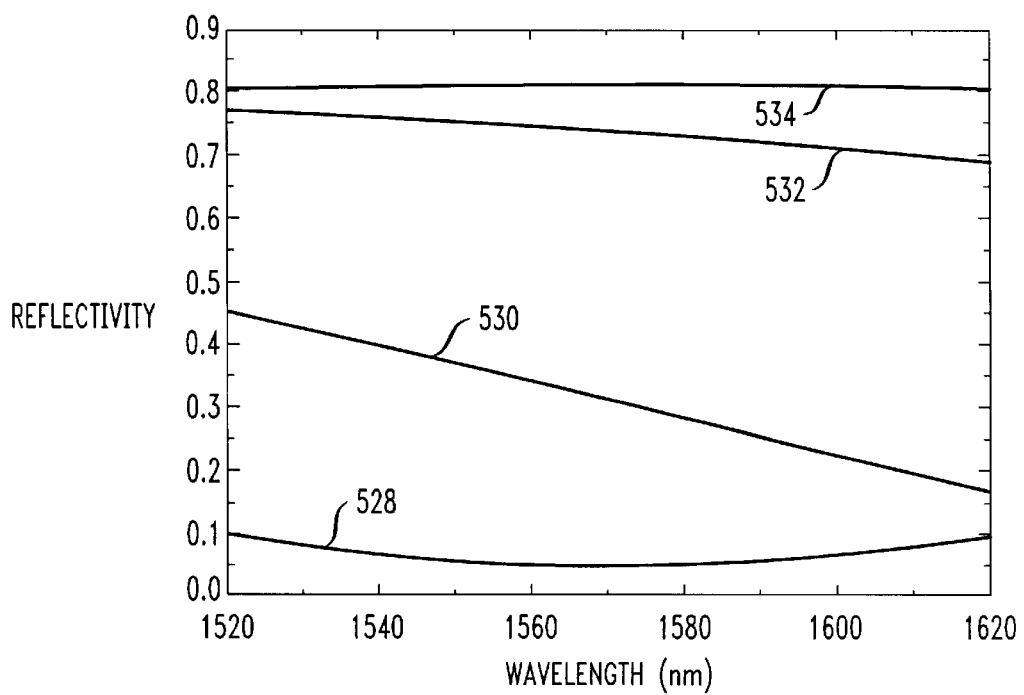
FIG. 5 depicts a reflectance spectra of a modulator in accordance with the present teachings having a silicon substrate and a quarter wave membrane with a refractive index equal to $1.25n_s^{0.5}$.

FIG. 5 depicts the reflectance spectra (i.e., modulator reflectivity versus wavelength) for a modulator having a silicon substrate ($n_s = 3.48$) and a quarter wave membrane having a refractive index, $n_m$, that is equal to $1.25n_s^{0.5}$. Plot 528 shows the spectra for a gap (between the substrate and membrane) of $2\lambda/4$ (7850 angstroms) based on a center wavelength of 1570 nanometers. Since $2\lambda/4$ is an even multiple of $\lambda/4$, reflectivity is at a minimum. Plot 534 shows the spectra for a gap of $3\lambda/4$ (11775 angstroms). Since $3\lambda/4$ is an odd multiple of $\lambda/4$, reflectivity is at a maximum, which, for this configuration, is about 80 percent reflectivity. Plots 530 and 532 show the spectra when the gap assumes intermediate values. In particular, plot 530 shows the gap at $0.55\lambda$ (8635 angstroms) and plot 532 shows the gap at $0.65\lambda$ (10205 angstroms).

Silicon nitride is advantageously used for the membrane since its refractive index is readily tailored to values required by the present invention. See, Smith et al., "Mechanism of $SiN_xH_y$ Deposition from $N_2$—$SiH_4$," J. Vac. Sci. Tech. B(8), No. 3, pp. 551–557 (1990), incorporated herein by reference. Any of a variety of materials can be used for the substrate, including, without limitation, silicon, germanium, and other materials listed in the previously referenced patents.

Germanium has typically been identified as suitable for use as a modulator substrate due to its refractive index and its electronic properties. Moreover, germanium is optically absorbing at fiber optic wavelengths (unlike silicon which is transparent) and thus forms a "beam dump" for non-reflected signals, preventing inadvertent scatter that might corrupt the outgoing signal.

The prior art has not, however, addressed a drawback of germanium that makes its use in a MEMS-based modulator quite problematic. In particular, germanium is attacked by the same etchant (e.g., hydrofluoric acid) that is typically used to remove various sacrificial layers of silicon dioxide in the formation of a MEMS-based modulator. Thus, germanium cannot simply be substituted for silicon during the fabrication of a MEMS-based modulator.

In accordance with the present teachings, a protective layer that is impervious to HF and that is optically transparent at the operating wavelengths of the modulator is disposed on the substrate. Silicon or polysilicon, for example, is suitably used as the protective layer. The protective layer is advantageously a half-wavelength thick (relative to the optical signal as measured in the protective layer). A half-wave layer provides, on reflection, a full cycle of travel for an optical signal thereby resulting in substantially no optical interference.

Figure 6:
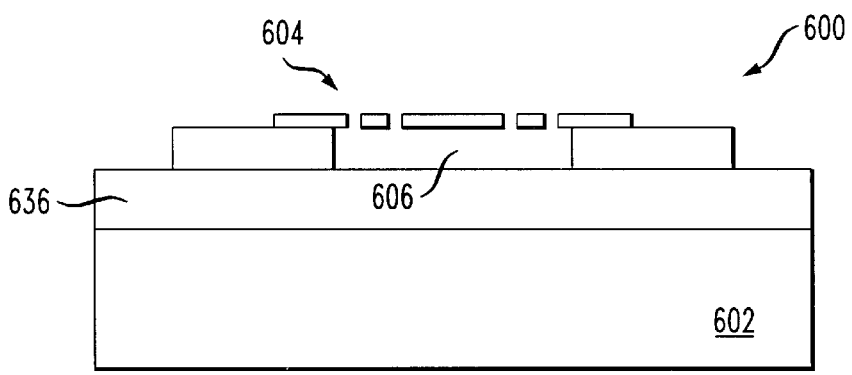
FIG. 6 depicts a modulator in accordance with the illustrative embodiment of the present invention.

FIG. 6 depicts a modulator 600 in accordance with the present teachings having a single layer membrane 604 that is characterized by a refractive index, $n_m$, that is advantageously in a range of about:

$$1.10n_s^{0.5} \leq n_m \leq 1.4n_s^{0.5} \quad [8]$$

Protective layer 636 is disposed on germanium substrate 602. Varying the gap 606 between protective layer 636 and membrane 604 alters the reflectivity of modulator 600 in the manner previously described.

Figure 7:
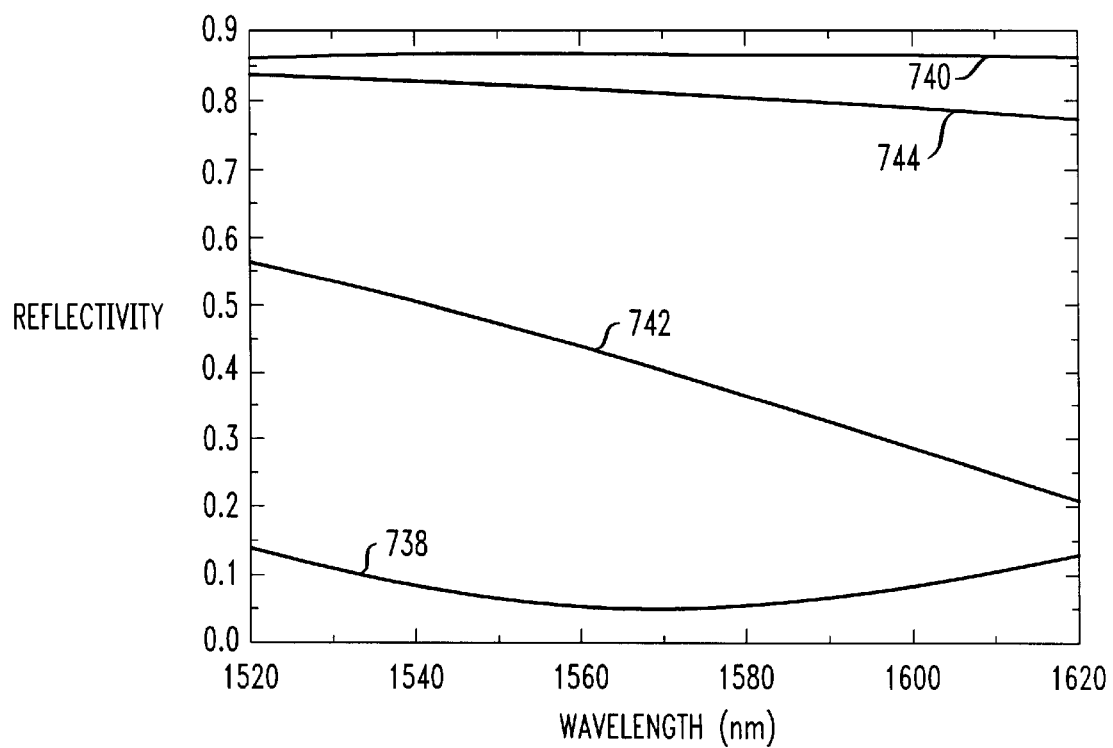
FIG. 7 depicts a reflectance spectra of a modulator in accordance with the present teachings having a germanium substrate, a half wave protective layer and a quarter wave membrane with a refractive index equal to $1.25n_s^{0.5}$.

FIG. 7 depicts the reflectance spectra for a modulator having a germanium substrate ($n_s = 4.23$), a half wave protective layer and a quarter wave membrane having a refractive index, $n_m$, that is equal to $1.25n_s^{0.5}$. Plot 738 shows the spectra for a gap (between the membrane 604 and protective layer 636) of $2\lambda/4$ (7850 angstroms) based on a center wavelength of 1570 nanometers. Since $2\lambda/4$ is an even multiple of $\lambda/4$, reflectivity is at a minimum. Plot 740 shows the spectra for a gap of $3\lambda/4$ (11775 angstroms). Since $3\lambda/4$ is an odd multiple of $\lambda/4$, reflectivity is at a maximum, which, for this configuration, is about 87 percent reflectivity. Plots 742 and 744 show the spectra when the gap assumes intermediate values. In particular, plot 742 shows the gap at $0.55\lambda$ (8635 angstroms) and plot 744 shows the gap at $0.65\lambda$ (10205 angstroms).

Comparing FIG. 5 (the spectra for a silicon-based modulator in accordance with the present teachings), with FIG. 7 (the spectra for the present germanium-based modulators), shows that germanium modulators exhibit a slight narrowing of bandwidth and a substantial increase in maximum reflectivity.

It is to be understood that the above-described embodiments are merely illustrative of the invention and that many variations may be devised by those skilled in the art without departing from the scope of the invention and from the principles disclosed herein. For example, while the membrane of the present modulators is described as being a quarter wave layer, it will be understood by those skilled in the art that increasing the thickness of the membrane by increments of $\lambda/2$ has substantially no effect on reflectivity. Consequently, a membrane having a thickness of $\lambda/4 + m\lambda/2$, where m = 0, 1, 2, ..., is suitable for use in conjunction with the present modulators. It is therefore intended that such variations be included within the scope of the following claims and their equivalents.

I claim:

1. An article comprising:
   a substrate having a refractive index $n_s$; and
   a membrane disposed in spaced relation to said substrate, the membrane consisting of a single, quarter-wave layer of material having a refractive index, $n_m$, wherein $1.1n_s^{0.5} \leq n_m \leq 1.4n_s^{0.5}$, wherein:
   under the action of an actuating force, said membrane is movable between a first position having a relatively greater reflectivity and a second position having a relatively lesser reflectivity.

2. The article of claim 1 wherein said substrate has an electrically conductive portion, said membrane has an electrically conductive portion and said actuating force is an electrostatic force.

3. The article of claim 1 wherein said substrate is silicon.

4. The article of claim 3 wherein said membrane is silicon nitride.

5. The article of claim 1 further comprising a layer of material disposed on said substrate, wherein:
   said layer of material is not electrically insulating;
   said layer of material is optically transparent; and
   said substrate is germanium.

6. The article of claim 5 wherein said layer of material is a half-wave layer.

7. The article of claim 5 wherein said layer of material is selected from the group consisting of polysilicon and silicon.

8. The article of claim 1 wherein said refractive index, $n_m$, of said membrane falls in a range: $1.25 n_s^{0.5} \leq n_m \leq 1.4 n_s^{0.5}$.

9. An article comprising:
   a substrate having a refractive index $n_s$; and
   a membrane disposed in spaced relation to said substrate, the membrane consisting of a single layer of material having a refractive index, $n_m$, wherein $1.1 n_s^{0.5} \leq n_m \leq 1.4 n_s^{0.5}$, and a thickness, $t_m = \lambda/4 + m\lambda/2$, where $m = 0, 1, 2, \ldots$;
   wherein:
      under the action of an actuating force, said membrane is movable between a first position having a relatively greater reflectivity and a second position having a relatively lesser reflectivity.

10. The article of claim 9 wherein said substrate is silicon.

11. The article of claim 10 wherein said membrane is silicon nitride.

12. The article of claim 9 further comprising a layer of material disposed on said substrate, wherein:
   said layer of material is not electrically insulating;
   said layer of material is optically transparent; and
   said substrate is germanium.

13. The article of claim 9 wherein said layer of material is a half-wave layer.

14. The article of claim 9 wherein said layer of material is selected from the group consisting of polysilicon and silicon.

15. The article of claim 9 wherein said refractive index, $n_m$, of said membrane falls in a range: $1.25 n_s^{0.5} \leq n_m \leq 1.4 n_s^{05}$.

* * * * *